Figure 1:
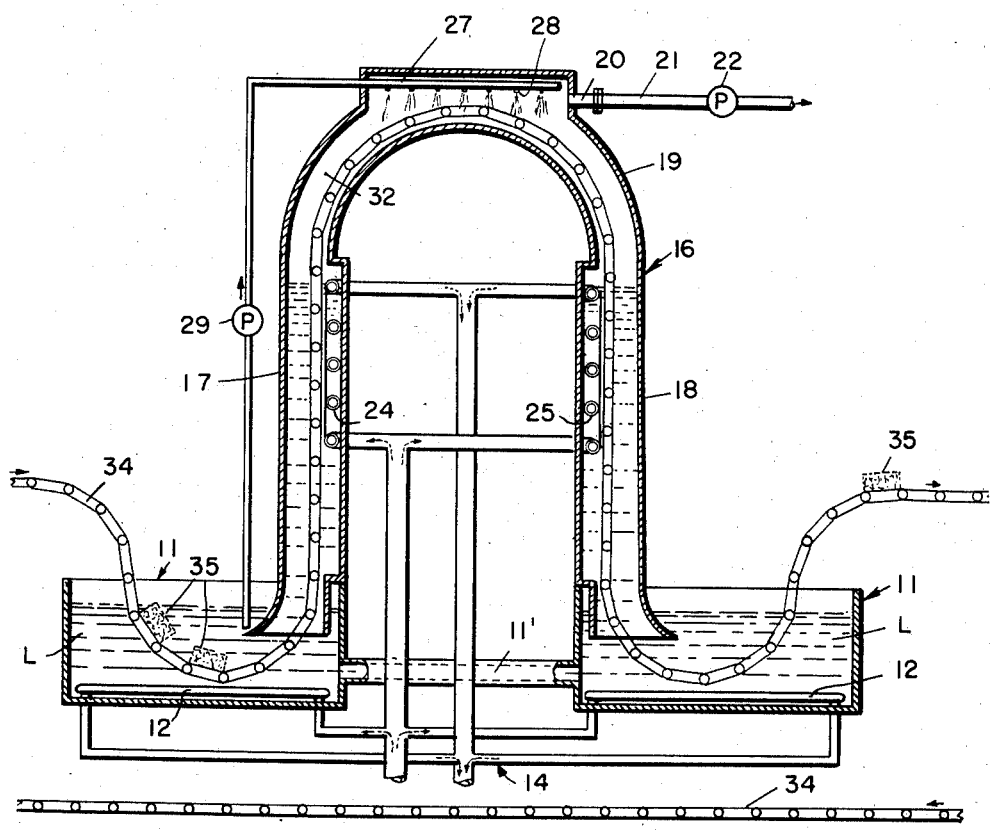

April 2, 1957  M. JULIUS  2,787,141

METHOD AND APPARATUS FOR PRECOOLING PRODUCE

Filed May 18, 1953

INVENTOR
MICHAEL JULIUS
BY

ATTORNEYS

United States Patent Office 2,787,141
Patented Apr. 2, 1957

2,787,141
METHOD AND APPARATUS FOR PRECOOLING PRODUCE

Michael Julius, Rivera, Calif.

Application May 13, 1953, Serial No. 355,785

9 Claims. (Cl. 62—169)

This invention has to do with the refrigeration or precooling of produce as it comes from the field prior to shipment thereof in refrigerated railway cars, trucks or the like and with the quick-freezing of other products.

An object of my invention is to provide a novel method and apparatus for cooling or precooling produce or other substances prior to storage or prior to transport of the produce under refrigeration.

Another object is to provide a simple, relatively economical method of rapidly cooling produce and to provide apparatus of relatively simple form and construction which can be economically operated for carrying out the method.

Still another object is to provide a process of the type indicated which will not dehydrate the produce.

A further object is to provide a method of and apparatus for precooling produce wherein the produce may flow continuously during the cooling.

Still another object is to provide apparatus of the nature indicated which is relatively compact.

A further object is to provide novel apparatus for freezing products.

Figure 2:
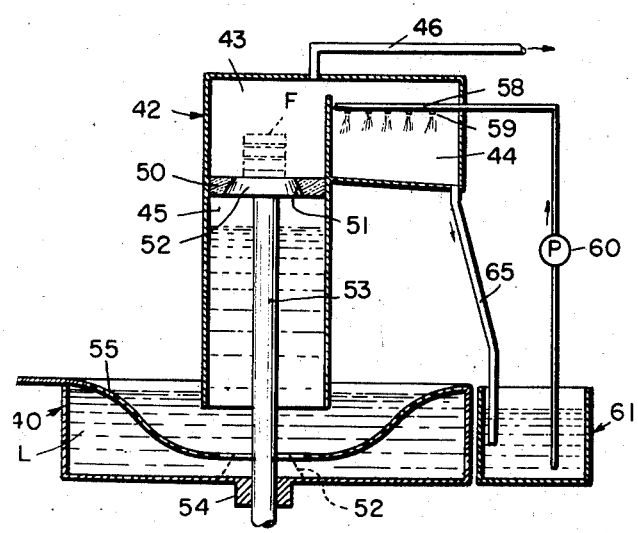

These and other objects will be apparent from the drawing. Referring to the drawing:

Fig. 1 is a diagrammatic representation of apparatus for precooling produce in accordance with the invention; and Fig. 2 is a diagrammatic representation of apparatus for freezing, embodying the invention.

More particularly describing the invention, in general my produce-cooling or precooling process comprises immersing the produce in a refrigerated liquid, such as water or brine, reducing the pressure on the produce to below atmospheric, then subjecting the produce to a vacuum in a substantially evacuated chamber, and thereafter returning the produce to atmospheric pressure by moving the same through a body of refrigerated liquid and gradually increasing the pressure upon the produce until the pressure is atmospheric.

Referring to Fig. 1 of the drawing, which is illustrative in a diagrammatic way of apparatus suitable for carrying out the produce-cooling method, I provide one or more tanks 11 for holding a supply of liquid L which is preferably aqueous although other types of liquid may be suitable. In the drawing two such tanks are shown, however, they may be considered as one, being shown connected by a conduit 11', and one large tank might be used instead. The liquid in these tanks is refrigerated in any conventional way and for this purpose the tanks have been shown provided with coils 12 through which a refrigerant or brine is circulated by means of a piping system 14 which is connected to any conventional refrigeration means.

In conjunction with the tanks 11 I provide a structure 16 which in essence is an open-ended tube or conduit having upright legs 17 and 18 and a connecting portion 19 therebetween. The lower ends of the legs are submerged beneath the surface of the liquid L in the tanks 11. The upper portion 19 of the structure 16 is provided with a fitting 20 and conduit 21 which lead to a vacuum pump 22, steam jet or other means for evacuating air. Within the legs 17 and 18 I provide refrigeration coils 24 and 25. At the upper end of the structure I provide means for spraying liquid into the upper end of the structure. This comprises a pipe 27 with spray heads 28, the pipe being supplied with liquid from tanks 11, a suitable pump 29 being provided.

In practice the tanks 11, structure 16, and piping would be insulated, however, this has not been illustrated.

To prepare the apparatus for use, air is substantially evacuated from the structure 16 through conduit 21 thereby drawing the liquid up the legs 17 and 18 as shown. I thereby provide a vacuum chamber 32 above the level of the liquid in the legs 17 and 18. It is to be understood, of course, that the legs 17 and 18 are sufficiently long that the liquid in rising to its normal height upon evacuation of air from the chamber 32 will still leave a substantial portion of the upper end of the structure 16 free of liquid to provide the aforementioned vacuum chamber 32.

For the purpose of conducting the produce through the legs 17, 18 and the vacuum chamber 32 I provide an endless conveyor 34 of any suitable construction, and this is threaded through the structure 16 and the tanks 11. Thus produce which may have been crated as indicated at 35 is fastened to the conveyor and can be drawn through the conduit structure 16 from the tank 11 into which leg 17 extends to the other tank and then conveyed beyond to the point where it is discharged or removed from the conveyor.

In the operation of the device the produce is loaded on conveyor 34 and preferably fastened thereto in any suitable manner. The produce first enters the tank at the left-hand side of the drawing at atmospheric pressure, passes beneath the surface of the liquid therein and then rises through leg 17, passing successively through that leg, vacuum chamber 32, leg 18, and the other tank 11 from which it emerges. In passing through leg 17 the pressure of the liquid on the produce gradually decreases until the produce emerges from the liquid into the vacuum chamber 32. As the produce leaves the vacuum chamber 32 and descends through leg 18 the pressure gradually increases until the produce reaches the other tank from which it emerges to the atmosphere.

To prevent large volume evaporation of the liquid, the pressure in the vacuum chamber may be maintained somewhat higher than the absolute vapor pressure of the liquid. For example, if water is used at a temperature of 33° F., its absolute vapor pressure would be .0923 lb. per sq. in. The pressure in the chamber might then be maintained at about .0961 lb. per sq. in. or a little higher. Liquid may be pumped through the spray heads 28 in chamber 32 as desired.

In passing through the leg 17 the originally warm produce is gradually cooled, the pressure on the produce gradually diminishing until the produce emerges from the liquid into the vacuum chamber. There further cooling takes place, the partially entrapped liquid in and throughout the product, such as lettuce, serving as a refrigerant. The produce then reenters the liquid at the top of the leg 18 and as it descends therein and passes out of the tank the pressure on the produce is gradually restored to atmospheric pressure.

I may also cool the liquid used in my apparatus by evaporation rather than resorting to the use of the refrigerated coils illustrated and conventional mechanical refrigeration equipment, however, this would involve additional apparatus to handle the large volume of water vapor.

It will also be apparent that the basic apparatus disclosed has many other uses. For example, it provides a simple means of obtaining a vacuum chamber for any desired purpose as for testing or the like. If it is to be used as a test chamber, articles can be run through the liquid in a sealed container and suitable means provided for opening the container in the vacuum chamber and closing it again before the article leaves the vacuum chamber.

In Fig. 2 I show another form of apparatus which may also be used for cooling, however, it is particularly designed to provide a vacuum chamber of extremely low temperature for quick-freezing. According to the drawing, numeral 40 indicates a tank in which is liquid L which may be a brine or water. Into this extends a lower end of a structure 42 which is partitioned to provide a freezing chamber 43, a brine chamber 44, and a liquid seal chamber 45. A vacuum may be created in the chambers 43 and 44 by evacuating therefrom through pipe 46. The liquid will then rise in the chamber 45 as shown. I preferably provide an insulation barrier wall 50 between the chambers 43 and 45. This is provided with an opening 51 which is adapted to be sealed by an elevator platform 52 on the upper end of a rod 53. Any suitable means may be provided for elevating and lowering the platform 52, the rod passing through a packing 54 in the bottom of the tank 40. The elevator platform 52 may be dropped or lowered to the broken-line position for the purpose of loading and unloading and the tank may be provided with a ramp 55 to facilitate this operation.

In order to provide an extremely cold atmosphere in the chamber 43 I provide a brine supply pipe 58 with suitable spray heads 59 in the chamber 44. A pipe 58 is supplied by pump 60 from a supply tank 61 and a return line or conduit 65 connects the chamber 44 with the tank.

In the operation of the device an article to be frozen, such as a crate of fish or the like designated F, is run into the tank 40 down the ramp 55 and placed on the elevator platform 52 with the same in lowered position. The elevator is then raised to the position of the product as shown in the drawing, the elevator platform 52 serving to seal off the cold chamber 43 from the warmer chamber 45. Brine is circulated through the pipe 58 and sprayed into the chamber 44 at a temperature of from 20° to 40° below zero thereby producing an extremely cold atmosphere in the chamber 43. After the product is frozen it is removed from chamber 43 by lowering the elevator platform to its lower position after which the product is removed from the elevator and taken out of the tank.

Although I have illustrated and described a preferred form of my invention, I contemplate that various changes and modifications can be made without departing from the invention, the scope of which is indicated by the following claims.

I claim:

1. In a method of cooling produce or the like, the steps of immersing the produce in a refrigerated liquid at atmospheric pressure, reducing the pressure of the liquid on the produce to a pressure substantially below atmospheric, removing the produce from the liquid at said reduced pressure and subjecting the removed produce to a relatively high vacuum, then immersing the produce in liquid at the reduced pressure of the vacuum, subsequently returning the pressure of the liquid on the produce to atmospheric, and removing the produce from said liquid.

2. The process set forth in claim 1 in which the liquid is aqueous.

3. In a method of cooling produce or the like, the steps of passing the produce through a body of refrigerated liquid the pressure of which varies from atmospheric to substantially below atmospheric, said produce entering the liquid where the pressure thereof is high and leaving it where the pressure is low, subjecting the produce to an atmosphere having a pressure substantially below atmospheric, and returning said produce to atmospheric pressure by passing the same through a body of refrigerated liquid the pressure of which varies from atmospheric to substantially below atmospheric, the produce entering the liquid where the pressure is low and leaving the liquid where the pressure is high.

4. The method of claim 3 wherein the liquid is aqueous.

5. In a method of cooling produce or the like, the steps of passing the produce through a liquid seal between the atmosphere and a vacuum chamber, subjecting the produce to a sub-atmospheric pressure slightly greater than the vapor pressure of the liquid in said vacuum chamber, and returning the produce to the atmosphere by passing the same through a liquid seal between the vacuum chamber and the atmosphere.

6. In produce-cooling apparatus, a container means open to the atmosphere, liquid in said container means, means forming a vacuum chamber at an elevation above said container means, means for evacuating said chamber, conduit means extending between said container means and said chamber, said chamber being sufficiently above said container means that, upon evacuation thereof, said liquid will rise in said conduit means only to a height short of filling said chamber and means for refrigerating said liquid.

7. Apparatus as set forth in claim 6 in which means is provided for spraying liquid into said vacuum chamber.

8. In apparatus of the type described, a container open to the atmosphere, means forming a chamber at an elevation above said container, means for evacuating said chamber, liquid in said container, a conduit extending between the chamber and container and extending into the container below the level of liquid therein, a wall between said chamber and said conduit, said wall having an opening, an elevator in said conduit movable between said container and said chamber, said elevator having a platform closing said opening in said wall when raised.

9. In apparatus of the type described, a container open to the atmosphere, means forming a chamber at an elevation above said container, means for evacuating said chamber, liquid in said container, a conduit extending between the chamber and container and extending into the container below the level of liquid therein, a wall between said chamber and said conduit, said wall having an opening, an elevator in said conduit movable between said container and said chamber, said elevator having a platform closing said opening in said wall when raised, and means for introducing brine into said chamber and draining brine from the chamber.

References Cited in the file of this patent

UNITED STATES PATENTS

| | | |
|---|---|---|
| 1,874,727 | Wiggins | Aug. 30, 1932 |
| 1,898,758 | Bottoms | Feb. 21, 1933 |
| 1,944,857 | Atwell | Jan. 23, 1934 |
| 2,019,551 | Varney | Nov. 5, 1935 |
| 2,059,970 | Robillard | Nov. 3, 1936 |
| 2,137,902 | Walter | Nov. 22, 1938 |
| 2,651,184 | Kasser | Sept. 8, 1953 |